(12) United States Patent
Vasseur et al.

(10) Patent No.: US 8,787,392 B2
(45) Date of Patent: Jul. 22, 2014

(54) DYNAMIC ROUTING METRIC ADJUSTMENT

(75) Inventors: Jean-Philippe Vasseur, Saint Martin d'Uriage (FR); Shmuel Shaffer, Palo Alto, CA (US); Sandeep Jay Shetty, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 285 days.

(21) Appl. No.: 12/971,094

(22) Filed: Dec. 17, 2010

(65) Prior Publication Data

US 2012/0155475 A1    Jun. 21, 2012

(51) Int. Cl.
*H04L 12/28* (2006.01)
*H04L 12/54* (2013.01)
*H04W 40/24* (2009.01)

(52) U.S. Cl.
CPC ............. *H04L 12/56* (2013.01); *H04W 40/248* (2013.01)
USPC ....................................................... 370/400

(58) Field of Classification Search
USPC ............... 370/238, 253, 255, 386, 400
See application file for complete search history.

(56) References Cited

U.S. PATENT DOCUMENTS

| | | | |
|---|---|---|---|
| 6,505,228 B1 * | 1/2003 | Schoening et al. | 718/106 |
| 6,873,839 B2 * | 3/2005 | Stanforth | 455/343.2 |
| 7,016,305 B1 | 3/2006 | Michelson et al. | |
| 7,298,707 B2 | 11/2007 | Retana et al. | |
| 7,512,106 B2 | 3/2009 | Van Tran et al. | |
| 7,567,577 B2 * | 7/2009 | Thubert et al. | 370/401 |
| 7,580,351 B2 | 8/2009 | Bettink et al. | |
| 7,580,918 B2 * | 8/2009 | Chang et al. | 1/1 |
| 7,623,474 B2 | 11/2009 | Tran et al. | |
| 7,643,485 B2 | 1/2010 | Viswanath et al. | |
| 7,697,505 B2 | 4/2010 | White et al. | |
| 7,821,956 B2 | 10/2010 | Retana et al. | |
| 8,363,711 B2 * | 1/2013 | Chung et al. | 375/232 |
| 2002/0141346 A1 * | 10/2002 | Garcia-Luna-Aceves et al. | 370/238 |
| 2009/0147714 A1 * | 6/2009 | Jain et al. | 370/311 |
| 2011/0228696 A1 * | 9/2011 | Agarwal et al. | 370/253 |
| 2011/0267954 A1 * | 11/2011 | Seetharaman et al. | 370/241 |

OTHER PUBLICATIONS

Thubert, "RPL Objective Function 0,", <draft-ietf-roll-of0-03>, Jul. 29, 2010 version.
Vasseur et al., "Routing Metrics Used for Path Calculation in Low Power and Lossy Networks," <draft-ietf-roll-routing-metrics-12>, Nov. 10, 2010 version.
Winter et al., "RPL: IPv6 Routing Protocol for Low Power and Lossy Networks," <draft-ietf-roll-rpl-15>, Nov. 11, 2010 version.

* cited by examiner

*Primary Examiner* — Dang Ton
*Assistant Examiner* — Nourali Mansoury
(74) *Attorney, Agent, or Firm* — Edwards, Wildman Palmer LLP; James M. Behmke; Stephen D. LeBarron

(57) ABSTRACT

In one embodiment, one or more routing update parameters may be set for and propagated to nodes of a directed acyclic graph (DAG) in a computer network, the routing update parameters indicative of when to perform a corresponding routing update operation. A decision node (e.g., a root node of the DAG, application in a head-end, etc.) may gather network statistics of the DAG during operation based on the routing update parameters, and may accordingly determine at least one adjusted routing update parameter based on the gathered network statistics. This adjusted routing update parameter may then be propagated to the nodes of the DAG, such that the nodes operate according to the (adaptively) adjusted routing update parameter.

23 Claims, 9 Drawing Sheets

DYNAMIC ROUTING METRIC ADJUSTMENT

TECHNICAL FIELD

The present disclosure relates generally to computer networks, and, more particularly, to directed acyclic graph (DAG) routing and management.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

Currently, network stability of LLNs can be problematic, particularly considering the dynamic nature of routing metrics in LLNs. Though metric values can be smoothed out such that new metrics are only advertised, and/or such that routes are only changed, when their values exceed some pre-configured thresholds, such thresholds are implementation specific and it is usually difficult to determine which threshold values should be used. Indeed, the routing metric setting for a small and stable LLN requiring accurate metrics greatly differs from that of a large scale network with unstable links where path optimality is not as critical of a requirement.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
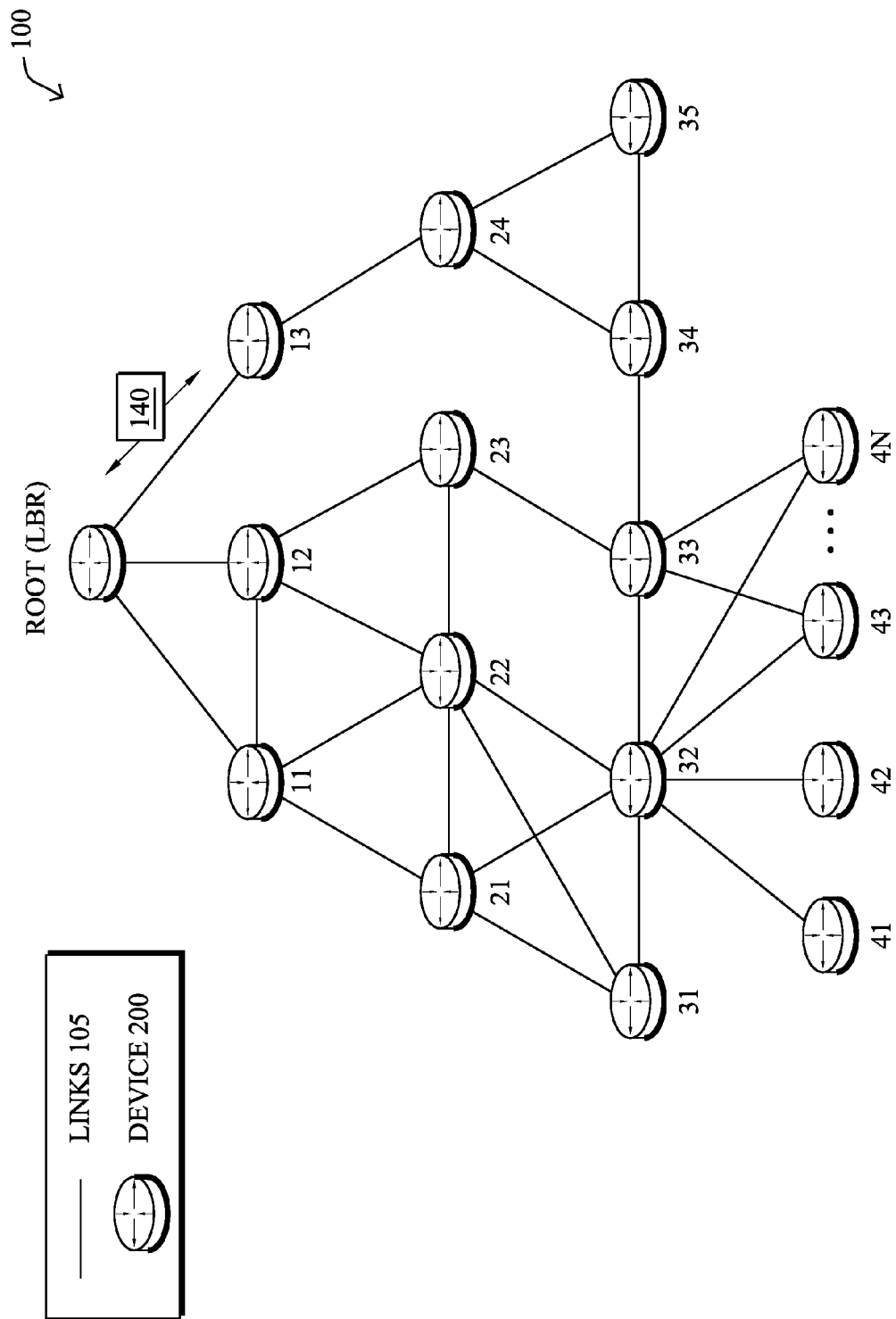
FIG. 1 illustrates an example computer network.

According to one or more embodiments of the disclosure, one or more routing update parameters may be set for, and propagating to, nodes of a directed acyclic graph (DAG) in a computer network, the routing update parameters indicative of when to perform a corresponding routing update operation. A decision node (e.g., a root node of the DAG) may gather network statistics of the DAG during operation based on the routing update parameters, and may accordingly determine at least one adjusted routing update parameter based on the gathered network statistics. This adjusted routing update parameter may then be propagated to the nodes of the DAG, such that the nodes operate according to the (dynamically) adjusted routing update parameter.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, CPL G3, Watt Pulse Communication (WPC), and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically wireless networks, though wired connections are also available. That is, in addition to one or more sensors, each sensor device (node) in a sensor network may generally be equipped with a radio transceiver or other communication port, a microcontroller, and an energy source, such as a battery. Generally, size and cost constraints on sensor nodes result in corresponding constraints on resources such as energy, memory, computational speed and bandwidth. Correspondingly, a reactive routing protocol may, though need not, be used in place of a proactive routing protocol for sensor networks.

In certain configurations, the sensors in a sensor network transmit their data, along with routing/relaying data from other sensors, to one or more centralized or distributed database management nodes that obtain the data for use with one or more associated applications. Alternatively (or in addition), certain sensor networks provide for mechanisms by which an interested subscriber (e.g., "sink") may specifically request data from devices in the network. In a "push mode," the sensors transmit their data to the sensor sink/subscriber without prompting, e.g., at a regular interval/frequency or in response to external triggers, such as alarm messages. Conversely, in a "pull mode," the sensor sink may specifically request that the sensors (e.g., specific sensors or all sensors) transmit their current data (or take a measurement, and transmit that result) to the sensor sink. (Those skilled in the art will appreciate the benefits and shortcomings of each mode, and both apply to the techniques described herein.)

FIG. 1 is a schematic block diagram of an example computer network 100 illustratively comprising nodes/devices 200 (e.g., labeled as shown, "Root," "11," "12," . . . "44," "4N") interconnected by various methods of communication. For instance, the links 105 may be wired links or may comprise a wireless communication medium, where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, while the embodiments are shown herein with reference to a generally "tree" shaped network, the description herein is not so limited, and may be applied to networks that have branches emitting to all directions from with the root node generally centralized among a plurality of surrounding nodes Illustratively, certain devices in the network may be more capable than others, such as those devices having larger memories, sustainable non-battery power supplies, etc., versus those devices having minimal memory, battery power, etc. For instance certain devices 200 may have no or limited memory capability. Also, one or more of the devices 200 may be considered "root nodes/devices" (or root capable devices), also referred to as LLN border routers (LBRs), while one or more of the devices may also be considered "destination nodes/devices."

Data packets 140 (e.g., traffic and/or messages sent between the devices/nodes) may be exchanged among the nodes/devices of the computer network 100 using predefined network communication protocols such as the Transmission Control Protocol/Internet Protocol (TCP/IP), User Datagram Protocol (UDP), Multi-Protocol Label Switching (MPLS), various proprietary protocols, etc. In this context, a protocol consists of a set of rules defining how the nodes interact with each other. In addition, packets within the network 100 may be transmitted in a different manner depending upon device capabilities, such as source routed packets.

Figure 2:
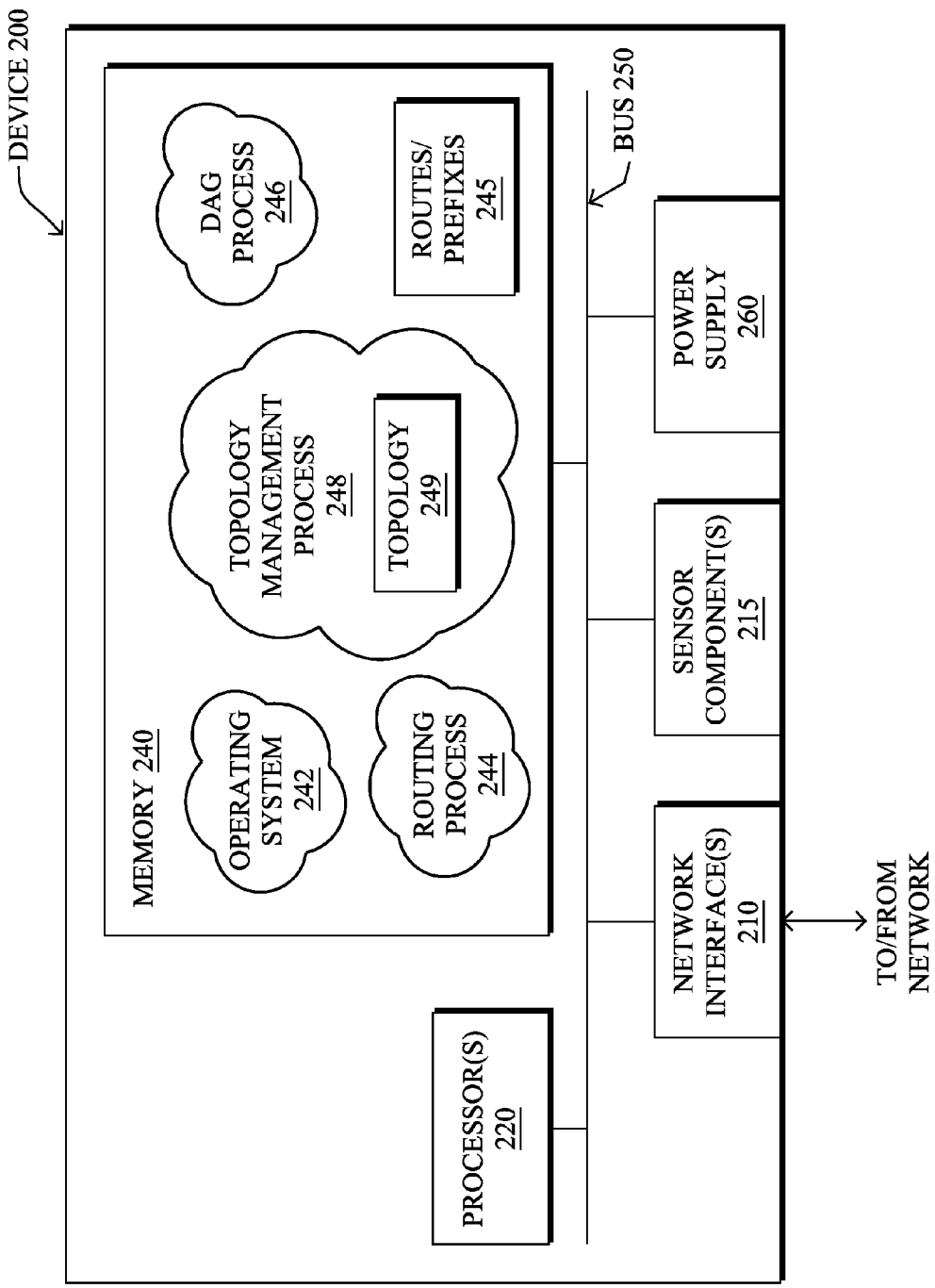
FIG. 2 illustrates an example network device/node.

FIG. 2 is a schematic block diagram of an example node/device 200 that may be used with one or more embodiments described herein, e.g., as a root node or other node (e.g., sensor) in the network. The device may comprise one or more network interfaces 210, one or more sensor components 215 (e.g., sensors, actuators, etc.), at least one processor 220 (e.g., an 8-64 bit microcontroller), and a memory 240 interconnected by a system bus 250, as well as a power supply 260 (e.g., battery, plug-in, etc.). Notably, a root node need not contain a sensor component 215.

The network interface(s) 210 contain the mechanical, electrical, and signaling circuitry for communicating data over physical and/or wireless links coupled to the network 100. The network interfaces may be configured to transmit and/or receive data using a variety of different communication protocols, including, inter alia, TCP/IP, UDP, wireless protocols (e.g., IEEE Std. 802.15.4, WiFi, Bluetooth®), Ethernet, powerline communication (PLC) protocols, etc. Note that the root may have two different types of network connections 210. Namely, one or more interfaces may be used to communicate with the mesh network (into the mesh cell), i.e., the other nodes shown in FIG. 1, while for the root node, another interface may be used as a WAN uplink network interface between the root node and, for example, a head-end device located through the WAN.

The memory 240 comprises a plurality of storage locations that are addressable by the processor 220 and the network interfaces 210 for storing software programs and data structures associated with the embodiments described herein. As noted above, certain devices may have limited memory or no memory (e.g., no memory for storage other than for programs/processes operating on the device). The processor 220 may comprise necessary elements or logic adapted to execute the software programs and manipulate the data structures, such as routes or prefixes 245 (notably on capable devices only). An operating system 242, portions of which are typically resident in memory 240 and executed by the processor, functionally organizes the device by, inter alia, invoking operations in support of software processes and/or services executing on the device. These software processes and/or services may comprise routing process/services 244, which may include an illustrative directed acyclic graph (DAG) process 246. Also, for root devices (or other management devices), a topology management process 248 and associated stored topologies 249 may also be present in memory 240, for use as described herein. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table 245 containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks"<draft-ietf-roll-rpl-15> by Winter, at al. (Nov. 11, 2010 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc.

A DAG is a directed graph having the property that all edges are oriented in such a way that no cycles (loops) are supposed to exist. All edges are contained in paths oriented toward and terminating at one or more root nodes (e.g., "clusterheads" or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, estimated transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks"<draft-ietf-roll-routing-metrics-12> by Vasseur, et al. (Nov. 10, 2010 version). Further, an example OF (e.g., a default OF) may be found in an IETF Internet Draft, entitled "RPL Objective Function 0"<draft-ietf-roll-of0-03> by Thubert (Jul. 29, 2010 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. This process helps build routing tables to send downward messages to any node in the DAG and not only to the leafs. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state.

Figure 3:
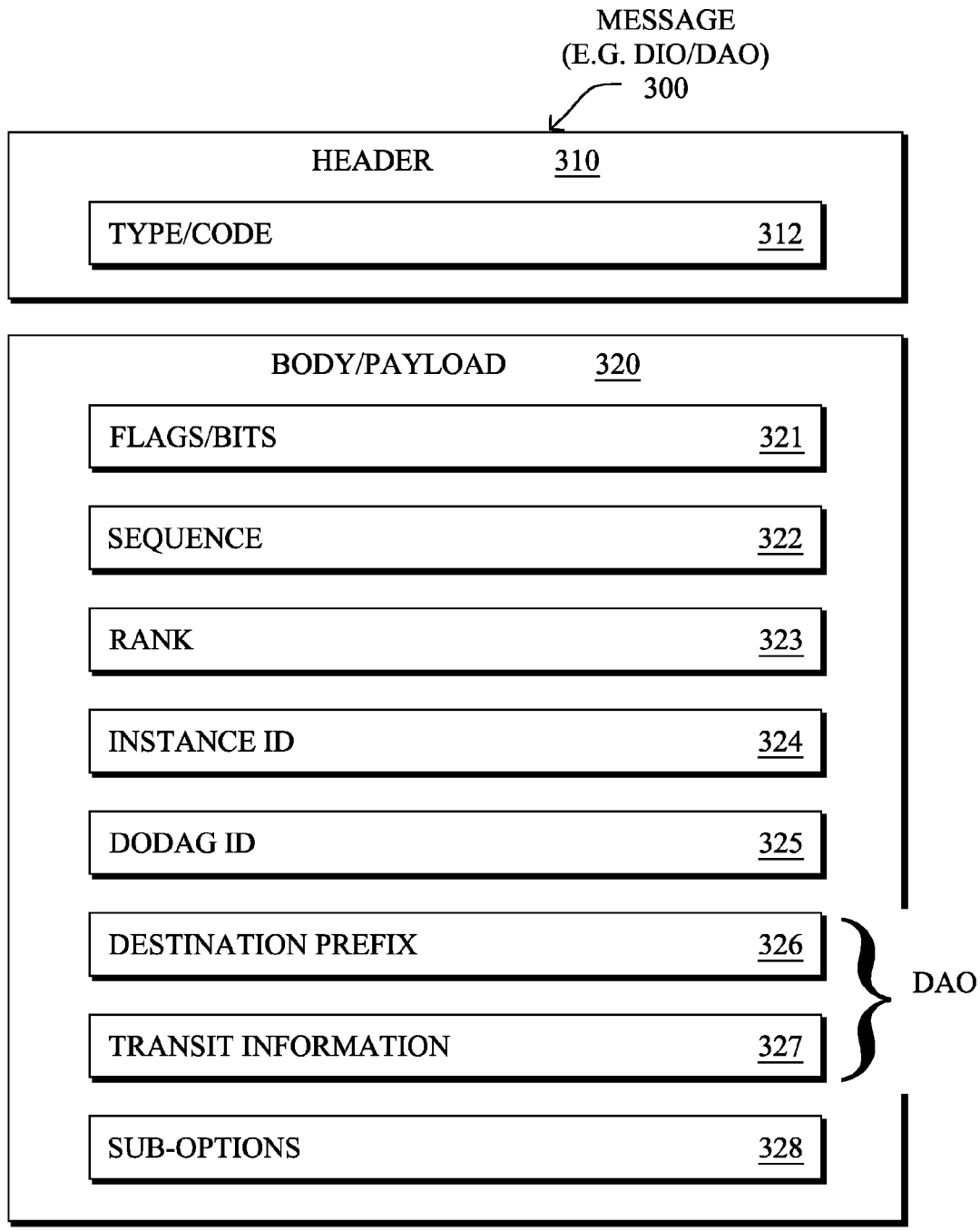
FIG. 3 illustrates an example message.

FIG. 3 illustrates an example simplified control message format 300 that may be used for discovery and route dissemination when building a DAG, e.g., as a DIO or DAO. Message 300 illustratively comprises a header 310 with one or more fields 312 that identify the type of message (e.g., a RPL control message), and a specific code indicating the specific type of message, e.g., a DIO or a DAO (or a DAG Information Solicitation). Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For either DIOs or DAOs, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields may be used to carry other certain information within a message 300, such as DAG metrics (a metric container) as may be described herein.

Figure 4:
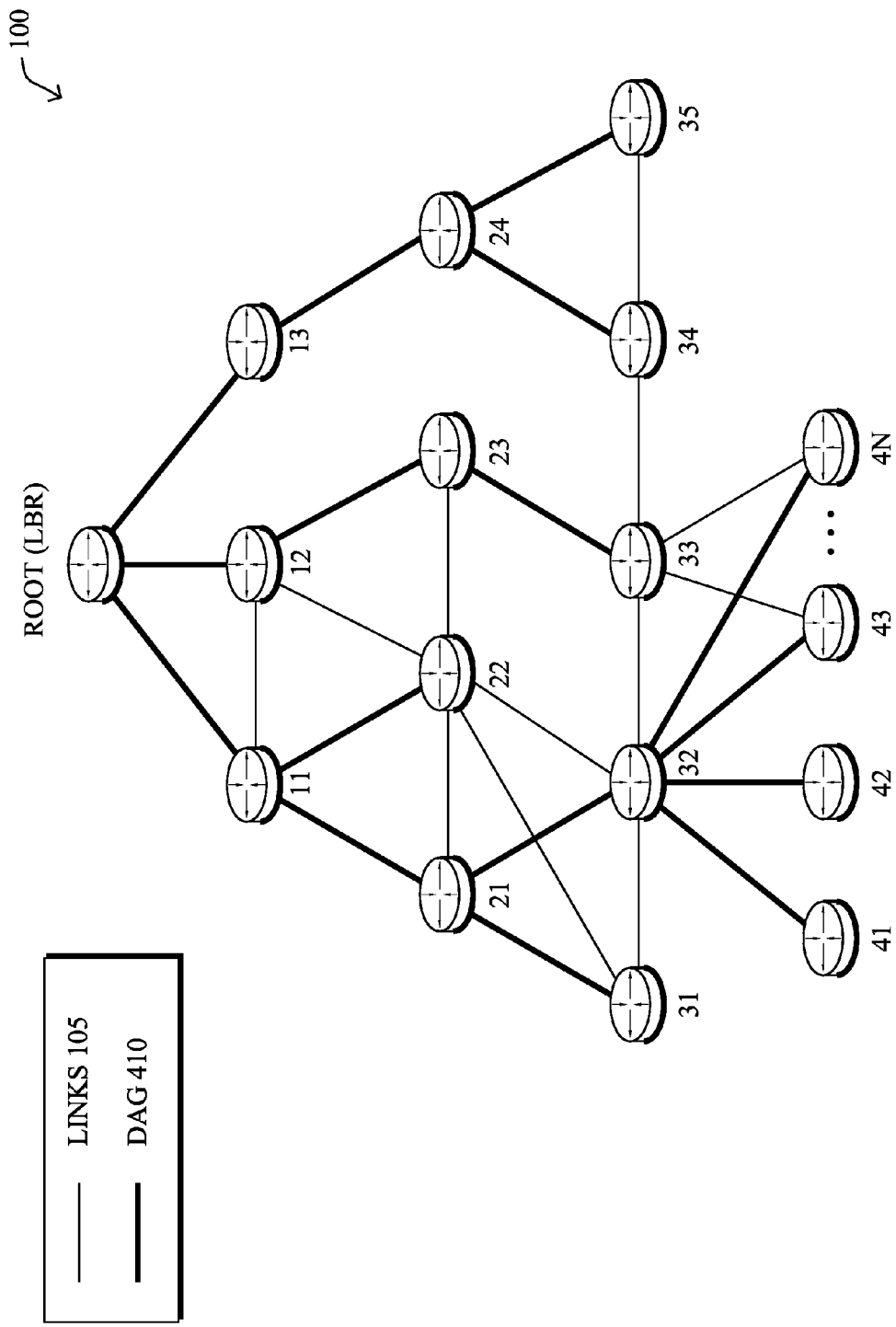
FIG. 4 illustrates an example directed acyclic graph (DAG) in the computer network of FIG. 1.

FIG. 4 illustrates an example DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as thicker lines), which extends from the root node toward one or more leaf nodes (nodes without children). Traffic/packets 140 (shown in FIG. 1) may then traverse the DAG 410 in either the upward direction toward the root or downward toward the leaf nodes.

As noted above, network stability of LLNs can be problematic, particularly considering the dynamic nature of routing metrics in LLNs. That is, due to an inherent property of LLNs, in particular, the metrics such as cost, delay, etc., may change frequently, and sometimes drastically. As such, the metric changes are advertised into the network and acted upon by receiving nodes in order to account for the dynamic changes. However, without a certain degree of "smoothing", the constant metric updates and routing changes would create an unstable network and an increased level of routing control messages (thus consuming power and increasing congestion and/or link contention). Smoothing may be defined, therefore, to have new metrics only advertised when their values exceed some pre-configured threshold, and to select a new parent (and consequently have new routes) when the gain exceeds some other pre-configured threshold.

Currently, such thresholds are manually configured, and are implementation specific. In particular, it is usually very difficult to determine which threshold values to use for any given network, that is, what works in one network may be entirely unsuitable for another network. For instance, the routing metric setting for a small and stable LLN requiring accurate metrics may greatly differ from that of a large scale network with unstable links where path optimality is not as critical of a requirement, where the thresholds used in such large scale networks lead to less optimal routes but allows for higher scalability.

Dynamic Routing Metric Adjustment

According to one or more embodiments of the disclosure, therefore, one or more routing update parameters may be set for, and propagating to, nodes of a DAG in a computer network, the routing update parameters indicative of when to perform a corresponding routing update operation. A decision node (e.g., a root node of the DAG) may gather network statistics of the DAG during operation based on the routing update parameters, and may accordingly determine at least one adjusted routing update parameter based on the gathered network statistics. This adjusted routing update parameter may then be propagated to the nodes of the DAG, such that the nodes operate according to the (dynamically) adjusted routing update parameter.

Illustratively, the techniques described herein may be performed by hardware, software, and/or firmware, such as in accordance with DAG process 246, which may contain computer executable instructions executed by the processor 220 to perform functions relating to the novel techniques described herein, e.g., in conjunction with routing process 244. For example, the techniques herein may be treated as extensions to conventional protocols, such as the RPL protocol, and as such, would be processed by similar components understood in the art that execute the RPL protocol, accordingly.

Operationally, there are two "routing update parameters" that are related to dynamic routing metrics in LLNs and RPL that are indicative of when to perform a corresponding routing update operation:

(1) The path cost change "C" that triggers a refresh of the path cost (e.g., minimum metric change required before advertising a particular metric change, for example, a hysteresis); and (2) The gain "G" that determines whether a node should select a new parent (e.g., a minimum path cost gain required before a particular node in the DAG selects a new parent node, for example, a decision threshold).

For example, if C=20% and G=30%, this means that each node on the network will update their path cost (e.g., resetting a Trickle timer and sending a new multicast RPL DIO message to their neighbor) if a link metric changes by more than 20%. Furthermore, only if a node learns of a new path that is at least 30% better than its current path, it may select a new parent.

Figures 5A, 5B:
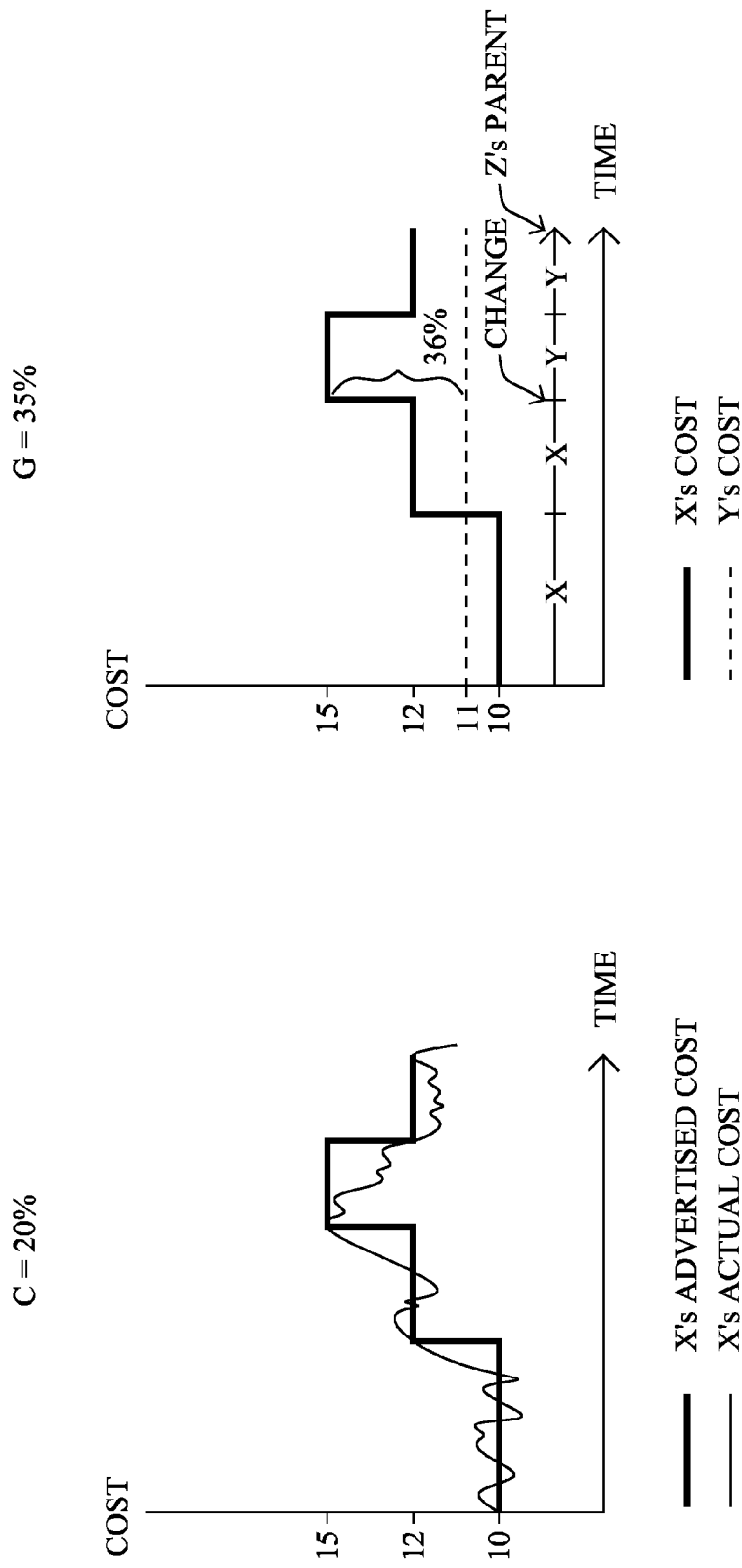
FIG. 5A illustrates an example smoothed routing metric advertisement.
FIG. 5B illustrates an example smoothed parent selection.

For example, FIGS. 5A and 5B illustrate this behavior. For instance, in FIG. 5A, assume that a node "X" has an initial advertised cost to the root of "10". This cost may oscillate due to various factors, such as signal strength, interference, delay, congestion, etc. However, assuming C is set to 20%, not until the cost reaches "12" does node X advertise the new cost. Similarly, once cost "12" has been advertised, a new cost isn't advertised until "15" is reached ("14.4" rounded up). The same threshold may apply in the reverse, such that once "15" is advertised, a 20% decrease is required before advertising the new cost, e.g., "12".

Similarly, FIG. 5B illustrates that a node "Z", a child of node X, based the decision on node X's initial cost of "10" as compared to a node Y's advertised value of "11". Assuming that the value for G is set to 35%, when X advertises the new cost of "12", even though the cost "11" is better than the cost "12", node Z does not reroute (select a new parent Y). Instead, node X waits until the gain of switching parents is at least 35%, which occurs when node X advertises the cost "15" assuming Y's cost remains the same (i.e., switching paths to a cost of "11" is a 36% gain over the cost "15").

Both C and G are thus used to adjust the control traffic load and routing oscillation in the network. Note that higher control plane traffic load (e.g., for routing) increases the power requirements of participating nodes, and as such adversely drains system resources, and thus should be avoided especially in battery-operated nodes. The lower are the values for C and G, the more optimal are the paths but the higher is the control plane traffic and the more frequent are path changes, potentially leading to undesirable oscillations and increased traffic load. For example, as described herein, if the amount of routing control traffic is high, then it may be appropriate to less frequently report the metric changes and/or react to them, and thus the thresholds may be adjusted accordingly. (It should be noted, however, that in certain network configurations, the amount of routing control traffic may differ throughout the network, e.g., based on depth of the nodes within the DAG. Accordingly, certain averages or other mechanisms to based new C and G values may be made that are not strictly based on this amount, or in certain networks, this amount may not be used at all.)

Note, also, that in a large scale network, for example, where links may be unstable, it is often of the utmost importance to only report a new metric when it significantly changes. In contrast, in a smaller network with stable links, it becomes possible to update the link metrics more often, thus leading to more optimal paths along the DAG. Note that network stability may be based on a rate of route changes in a network, hence a "stable" network is one with less than a pre-determined number of route changes in a pre-defined window of time.

Figure 6:
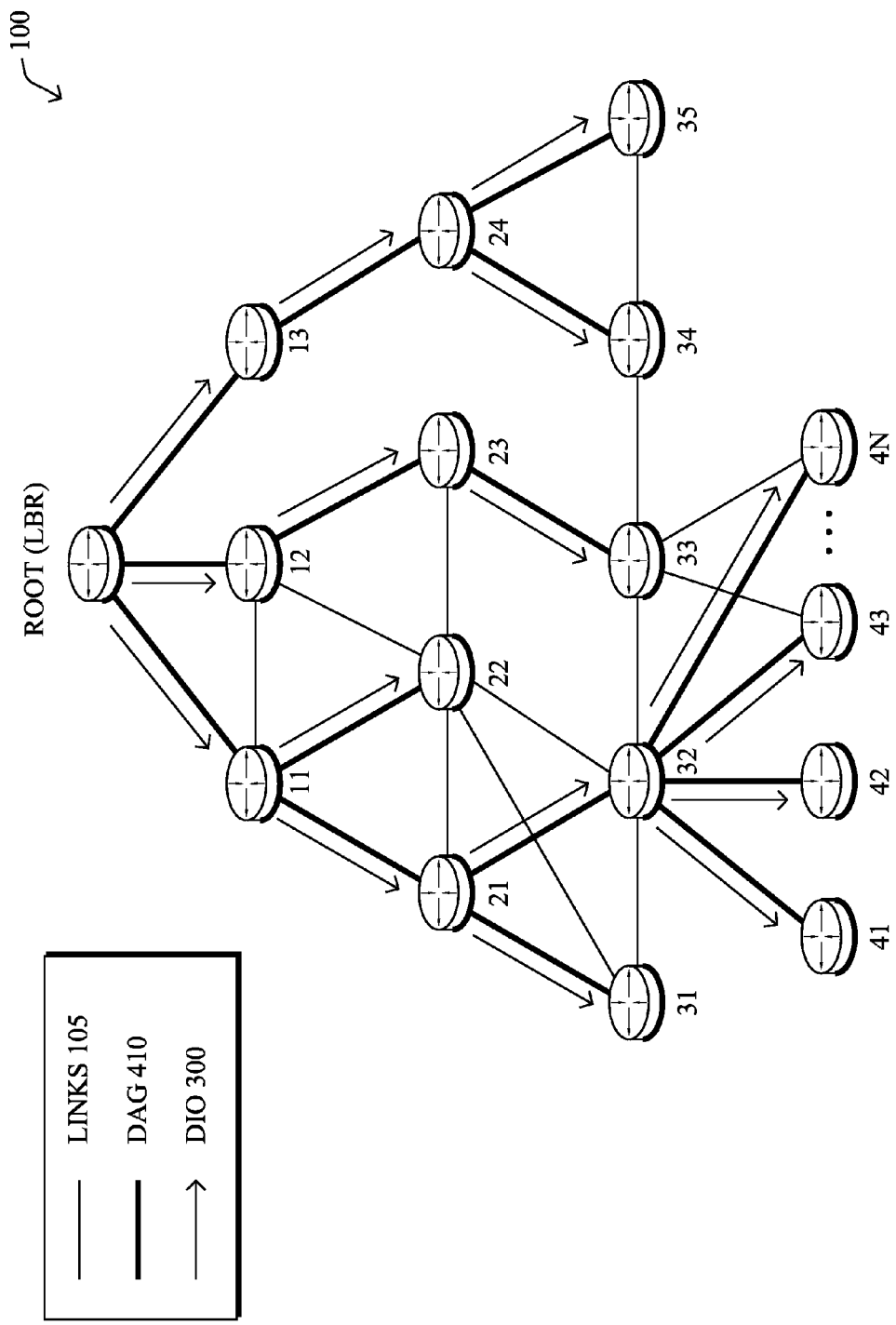
FIG. 6 illustrates an example message exchange in the network.

According to one or more techniques herein, therefore, contrary to manually and locally configuring C and G values on each node of the network, the values of C and G may be dynamically adjusted based on feedback about networking behavior of the LLN (e.g., network statistics). Specifically, the routing update metrics (values of C and G) may be initially set and propagated to nodes of the DAG in a DIO message 300, as shown in FIG. 6. For instance, the root node, or other decision device (e.g., head-end device), may set the values and distribute them to the nodes. Illustratively, a new type-length-value (TLV) field may be carried in a DAG metric container of the DIO message (sub-option field 328) that provides the ability to the DAG root (or other decision device) to control the values of C and G for the entire network. Nodes that receive the routing update parameters may thus configure their operation according to the routing update parameters (e.g., C and G values).

Figure 7:
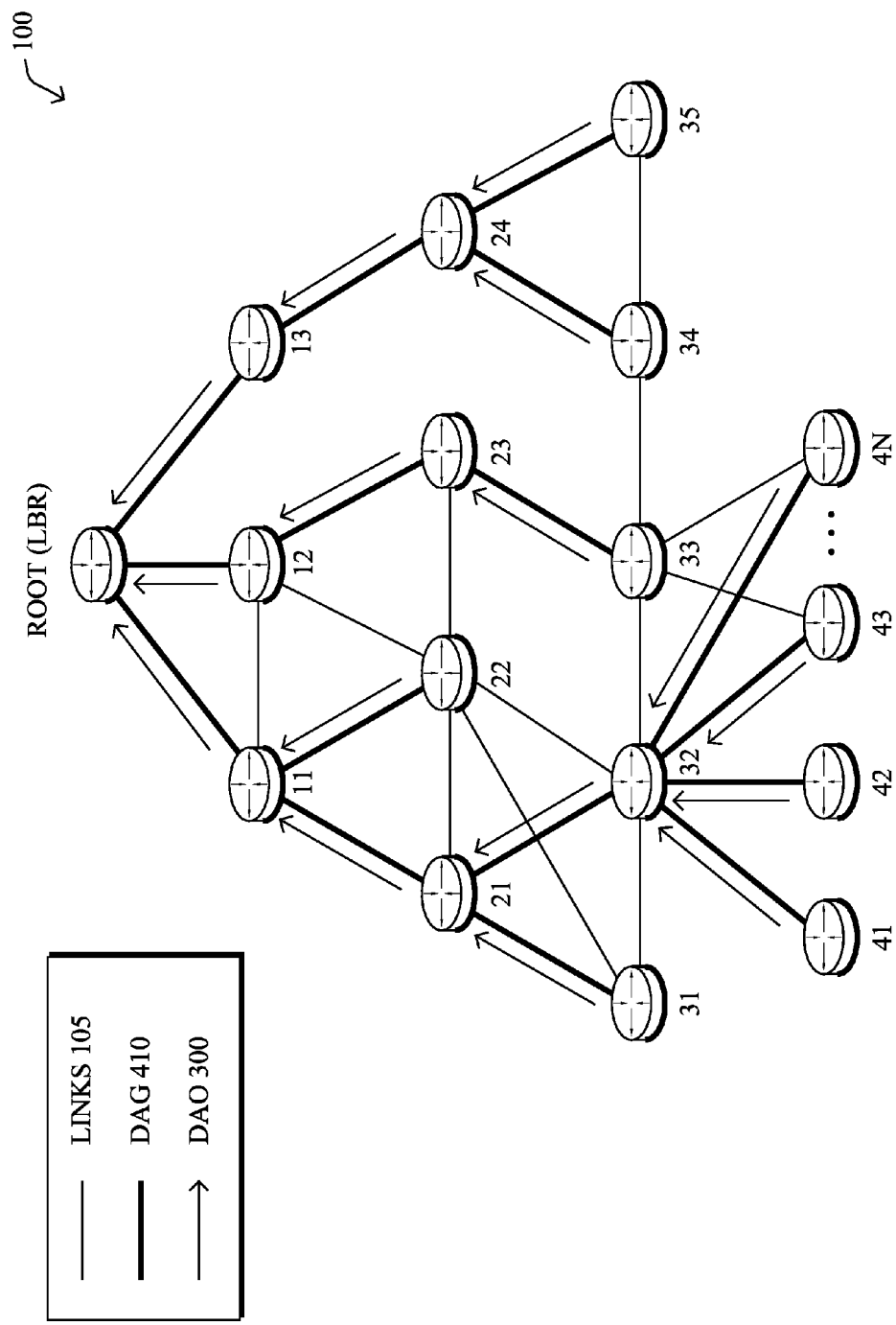
FIG. 7 illustrates another example message exchange in the network.

Once a set of routing update parameters is propagated to the nodes of the DAG 410, e.g., the initial values or updated values herein, an optional timer may be initialized at the decision device (e.g., root node), such that until expiration of the timer (or until other event, such as network problems, errors, congestion, instability, etc.), various network statistics may be gathered. Specifically, statistics about the RPL routing domain may be collected by the nodes of the DAG during operation based on the current routing update parameters, and then transmitted toward the decision device for processing. FIG. 7 illustrates an example propagation of network statistic messages (e.g., DAOs 300) up the DAG to be received at the root, which may process the information or forward it to a decision device (e.g., in the WAN).

Illustratively, network statistics may include (but are not limited to) various key metrics that allow the decision device to observe any oscillation in network or optionally to more provide more aggressive (lower) values for C and G. For example, certain statistics comprise: an amount of routing traffic (in certain networks, as noted above); a number of routing path changes; a number of new parent selections; a level of sub-optimality provided by DAG paths; a number of dropped/lost packets; a number of collisions; the amount of battery power remaining in the various nodes, etc. Note that the set of network statistics to be particularly measured may be explicitly requested by the decision device through DIO messages 300 (FIG. 6) along the DAG.

The network statistic information provided to the DAG root (or other decision device) may then be used to determine how the routing update parameters should be dynamically tuned (adjusted). Specifically, after the expiration of the timer (or in response to other events, noted above), the decision device analyzes the effect of the current values for the parameters (e.g., C and G values). If there is room for network improvement based on the statistics, either in terms of stability or optimization, the decision device may determine at least one adjusted routing update parameter. For example, in a very stable network, it could be determined that more aggressive (e.g., decreased) values could be used. Conversely, in response to network instability, the values may be increased to create a more conservative environment.

Various approaches could be used to determine the adjustments to the parameter values. For example, the parameters may be incrementally adjusted based on the statistics, such as small incremental increases or decreases, which may change the statistics slowly (or not at all or drastically), until some desired threshold of optimality versus instability is reached. Alternative approaches may also be used, such as a dichotomous approach, a tiered approach, a weighted approach, etc. Notably, one or a plurality (e.g., both C and G) can be adjusted at any given time, resulting in different reactions by the network which may be accounted for in future adjustments, e.g., alternating adjustment of C or G values as a more conservative approach to adjusting them both at the same time.

As may be inferred from above, the adjusted routing update parameter(s) may be propagated to the nodes in the DAG (FIG. 6), such that nodes receive the updated parameters and adjust their operation accordingly. Note that where only one parameter is adjusted, either that one parameter alone may be propagated, or else all of the parameters may be propagated (e.g., one or more updated/adjusted, the remaining the same as a previous value). Network statistics based on the adjusted parameters may again be collected and gathered at the decision device, and potentially new adjustments may be made to the parameters to optimize or stabilize the network, accordingly. For instance, where incremental adjustments are made, the network may become more and more optimized with each iteration, or else more and more stabilized with each iteration.

It is thus possible with the embodiments herein to collect network behavior statistics (amount of power left in the batteries of various nodes, how often nodes change their preferred parent, amount of routing/control plane traffic, etc.) so as to determine how to dynamically tune the routing update parameters, e.g., C and G values. For example, as mentioned above, if the network gets too unstable, then the values of C and G may be dynamically increased by updating their values in a new DIO message that travels along the DAG. Conversely, if the level of routing oscillation (e.g., the frequency of path changes) and/or the amount of control plane traffic is low, then C and G may be decreased so as to improve the path cost accuracy and path qualities.

Figure 8:
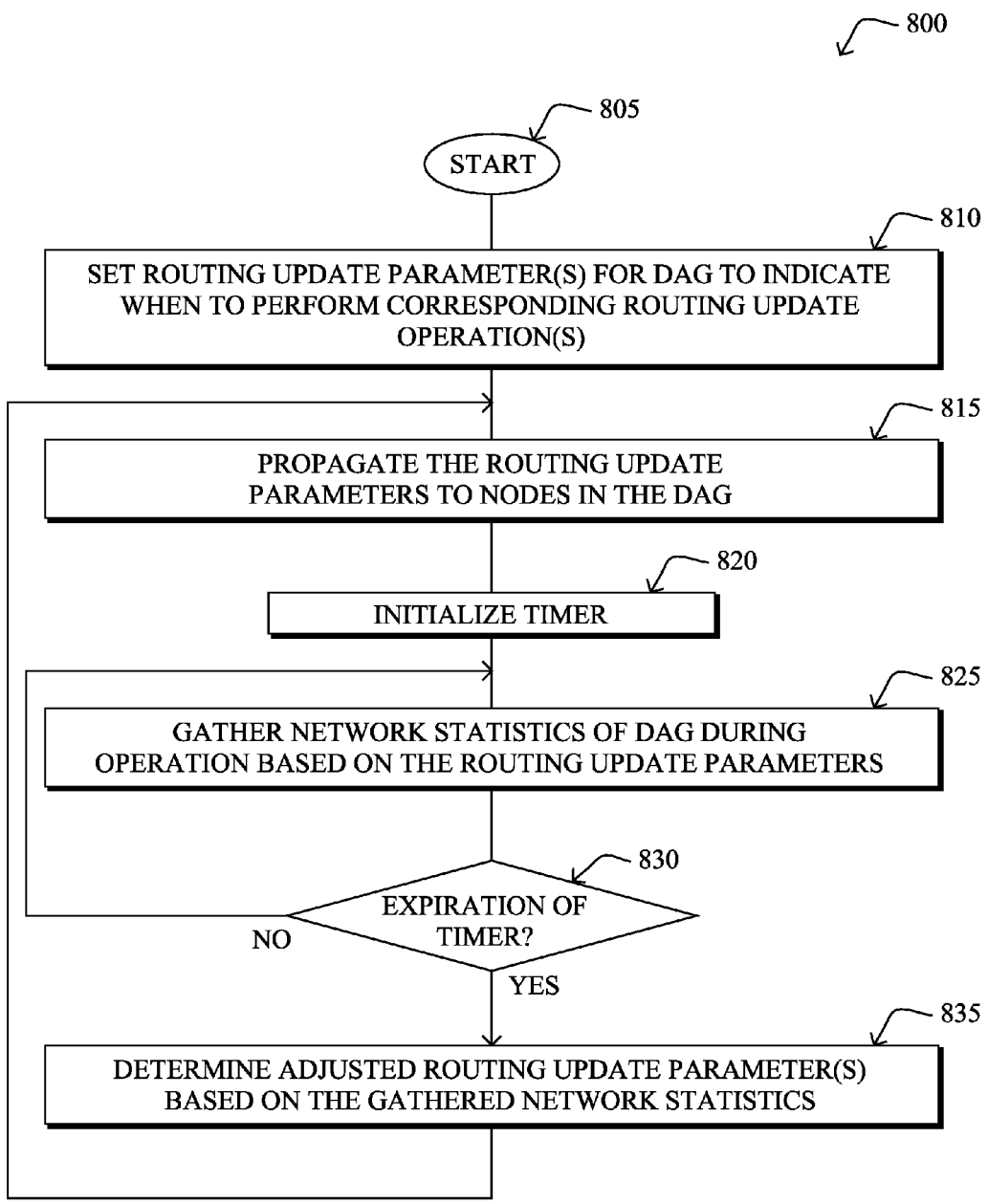
FIG. 8 illustrates an example simplified procedure for dynamic routing metric adjustment from the perspective of a decision device (e.g., root node)

In closing, FIG. 8 illustrates an example simplified procedure for dynamically adjusting routing update parameters in accordance with one or more embodiments described herein, e.g., from the perspective of the decision device (e.g., root node). The procedure 800 starts at step 805, and continues to step 810, where the decision device sets initial routing update parameter(s) for the DAG 410 to indicate when to perform corresponding routing update operation(s), such as the C and G values described above. The parameters may then be propagated to nodes in the DAG in step 815, illustratively using a DIO message 300.

In response to propagating the parameters in step 815, the decision device may initialize a timer in step 820, and during the timer, may gather network statistics of the DAG during operation based on the routing update parameters in step 825. For instance, the network statistics may be visible to the root node (decision device), or else, illustratively, the statistics are received from the nodes in the DAG (e.g., via DAO messages 300). The statistics may be gathered until expiration of the timer in step 830, at which time the decision device may determine one or more adjusted routing update parameter based on the gathered network statistics. For instance, as described above, the routing update parameters may be increased or decreased in order to optimize the network if currently stable, or stabilize the network if currently unstable. Alternatively or is addition, the routing update parameters may be increased or decreased based on the amount of battery power available in the various nodes. For example in a sensor network with battery powered nodes that have solar charging capability, the values of C and G may be set for a more aggressive optimization during the day when the battery is being charged from the photo-voltaic cells and then set to a lower aggressive optimization policy during the night when battery power must be preserved. The procedure may then return (e.g., repeatedly) to step 815 to propagate the updated adjusted parameters to the nodes of the DAG in order to dynamically adjust the DAG's operation, accordingly.

Figure 9:
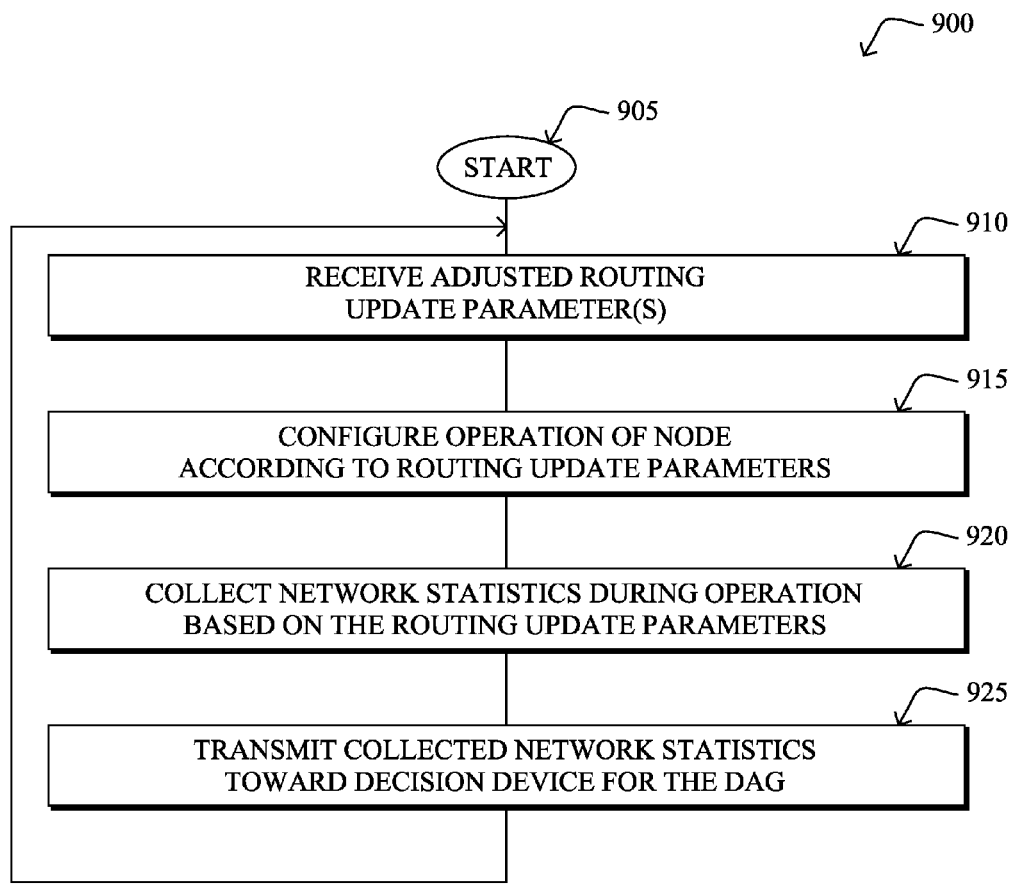
FIG. 9 illustrates an example simplified procedure for dynamic routing metric adjustment from the perspective of a DAG node.

Additionally, FIG. 9 illustrates an example simplified procedure for dynamically adjusting routing update parameters in accordance with one or more embodiments described herein, e.g., from the perspective of a DAG node. The procedure 900 starts at step 905, and continues to step 910, where the node may receive adjusted (or initial) routing update parameters from a root node (decision device). As such, in step 915, the node may configure its operation according to the routing update parameters. During operation, in step 920, the node may collect various network statistics, such as amount of power left in batteries which power various nodes, route changes, packet loss, etc., as mentioned above, and in step 925 (e.g., periodically, in response to a change, in response to a particular requested time period, etc.), the node may transmit the collected network statistics toward decision device for the DAG, illustratively in a DAO 300. The procedure 900 may then (e.g., repeatedly) return to step 910 to receive dynamically adjusted (updated) routing update parameters from the decision device based on the network statistics, as described herein.

The novel techniques described herein, therefore, provide for dynamically adjusting routing update parameters (e.g., C and G values) in a computer network. In particular, by providing a "learning" machine that can gather network statistics, the novel techniques allow for dynamic setting of routing update parameters in order to optimize the management of battery powered nodes, increase the degree of stability, and avoid oscillations while trying to optimize path quality. Specifically, network stability and optimization is achieved in an illustrative embodiment by dynamically adjusting the values of C and G used by the routing protocol to determine when to update a link metric and when to select another parent according to the network statistics (e.g., number of path changes, remaining battery power of various nodes, amount of control plane traffic, etc.).

Further, the adaptive (dynamic) techniques above provide functionality that would be difficult, if not practically impossible, to perform manually, particularly for the potentially large number of nodes in a network. That is, RPL has been designed to provide a high degree of flexibility thanks to the central decision of a number of RPL parameters by, e.g., the DAG root. The downside effect of this, however, is that a network administrator has to configure a large set of timers and variables, which may be a cumbersome task and fairly difficult since the network characteristics may greatly vary with the environment (smart cities, smart grids, homes, etc.). Accordingly, the novel techniques herein provide adaptive adjustment of the routing update parameters (e.g., C and G values) according to the network statistics of the particular network.

While there have been shown and described illustrative embodiments that dynamically adjusting routing update parameters in a computer network, it is to be understood that various other adaptations and modifications may be made within the spirit and scope of the embodiments herein. For example, the embodiments have been shown and described herein with relation to LLNs, and more particular, to the RPL protocol. However, the embodiments in their broader sense are not as limited, and may, in fact, be used with other types of networks and/or protocols utilizing DAG routing (e.g., distance vector protocols) with routing update parameters. Also, while the techniques described above reference particular network statistics and/or particular routing update parameters, these are meant to be taken as merely illustrative examples, and other suitable statistics and/or parameters may be used in accordance with the techniques herein, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
setting one or more routing update parameters for a directed acyclic graph (DAG) in a computer network, the routing update parameters indicative of when to perform a corresponding routing update operation;
propagating the routing update parameters to nodes in the DAG;
gathering one or more network statistics of the DAG during operation based on the routing update parameters;
in response to gathering the one or more network statistics, determining at least one adjusted routing update parameter based on the gathered network statistics;
propagating the adjusted routing update parameter to the nodes in the DAG;
adjusting the routing update parameters to a less-aggressive route update policy when specific nodes are running low on power; and
adjusting the route update parameters to a more-aggressive route update policy when the specific nodes have sufficient power.

2. The method as in claim 1, wherein a particular routing update parameter is a minimum link metric change required before advertising a particular metric change.

3. The method as in claim 1, wherein a particular routing update parameter is a minimum path cost gain required before a particular node in the DAG selects a new parent node.

4. The method as in claim 1, wherein the network statistics are selected from a group consisting of: an amount of routing traffic; an amount of power remaining in battery operating nodes; a number of routing path changes; a number of new parent selections; a level of sub-optimality provided by DAG paths; a number of dropped packets; and a number of collisions.

5. The method as in claim 1, wherein gathering comprises: receiving the network statistics from the nodes in the DAG.

6. The method as in claim 1, wherein setting, propagating, gathering, and determining are performed by a root node of the DAG.

7. The method as in claim 1, wherein there is a plurality of routing update parameters, the propagating of the adjusted routing parameter comprising:
propagating the plurality of routing update parameters including the adjusted routing parameter.

8. The method as in claim 1, wherein there is a plurality of routing update parameters, wherein the determining of the at least one adjusted routing parameter comprises adjusting each of the plurality of routing update parameters.

9. The method as in claim 1, further comprising:
initializing a timer in response to propagating the adjusted routing parameter;
gathering updated network statistics during the timer; and
determining the at least one adjusted routing update parameter based on the gathered network statistics in response to expiration of the timer.

10. The method as in claim 1, wherein determining comprises:
incrementally adjusting a particular routing update parameter based on the gathered network statistics.

11. The method as in claim 1, wherein whether the specific nodes have sufficient power is based on observations of batteries of the specific nodes.

12. An apparatus, comprising:
one or more network interfaces;
a processor coupled to the network interfaces and configured to execute one or more processes; and
a memory configured to store a process executable by the processor, the process when executed operable to:
set one or more routing update parameters for a directed acyclic graph (DAG) in a computer network, the routing update parameters indicative of when to perform a corresponding routing update operation;
propagate the routing update parameters to nodes in the DAG;
gather one or more network statistics of the DAG during operation based on the routing update parameters;
determine at least one adjusted routing update parameter based on the gathered network statistics in response to gathering the one or more network statistics;
propagate the adjusted routing update parameter to the nodes in the DAG,
adjust the routing update parameters to a less-aggressive route update policy when specific nodes are running low on power; and
adjust the route update parameters to a more-aggressive route update policy when the specific nodes have sufficient power.

13. The apparatus as in claim 12, wherein a particular routing update parameter is a minimum link metric change required before advertising a particular metric change.

14. The apparatus as in claim 12, wherein a particular routing update parameter is a minimum path cost gain required before a particular node in the DAG selects a new parent node.

15. The apparatus as in claim 12, wherein the network statistics are selected from a group consisting of: an amount of routing traffic; an amount of power remaining in battery operating nodes; a number of routing path changes; a number of new parent selections; a level of sub-optimality provided by DAG paths; a number of dropped packets; and a number of collisions.

16. The apparatus as in claim 12, wherein the network interfaces are configured to receive the network statistics from the nodes in the DAG.

17. The apparatus as in claim 12, wherein the apparatus is a root node of the DAG.

18. The apparatus as in claim 12, wherein there is a plurality of routing update parameters, the process when executed to propagate the adjusted routing parameter further operable to propagate the plurality of routing update parameters including the adjusted routing parameter.

19. The apparatus as in claim 12, wherein the process when executed is further operable to:
initialize a timer in response to propagating the adjusted routing parameter;
gather updated network statistics during the timer; and
determine the at least one adjusted routing update parameter based on the gathered network statistics in response to expiration of the timer.

20. The apparatus as in claim 12, wherein the process when executed to determine is further operable to:
incrementally adjust a particular routing update parameter based on the gathered network statistics.

21. The apparatus as in claim 12, wherein whether the specific nodes have sufficient power is based on observations of batteries of the specific nodes.

22. A tangible, non-transitory, computer-readable media having software encoded thereon, the software when executed by a processor on a device operable to:
set one or more routing update parameters for a directed acyclic graph (DAG) in a computer network, the routing update parameters indicative of when to perform a corresponding routing update operation;
propagate the routing update parameters to nodes in the DAG;
gather one or more network statistics of the DAG during operation based on the routing update parameters;
determine at least one adjusted routing update parameter based on the gathered network statistics in response to gathering the one or more network statistics;
propagate the adjusted routing update parameter to the nodes in the DAG;
adjust the routing update parameters to a less-aggressive route update policy when specific nodes are running low on power; and
adjust the routing update parameters to a more-aggressive route update policy when specific nodes have sufficient power.

23. A method, comprising:
receiving one or more adjusted routing update parameters for a directed acyclic graph (DAG) at a node in a computer network, the routing update parameters indicative of when to perform a corresponding routing update operation;
configuring operation of the node according to the one or more routing update parameters;
collecting one or more network statistics during operation of the node based on the routing update parameters;
in response to collecting the one or more network statistics, transmitting the collected network statistics toward a decision device for the DAG to be used to adjust the routing update parameter;
receiving an updated adjusted routing update parameter from the decision device;
adjust the routing update parameters to a less-aggressive route update policy when specific nodes are running low on power; and
adjust the routing update parameters to a more-aggressive route update policy when specific nodes have sufficient power.

* * * * *